J. M. HALLEY.
EGG TESTER.
APPLICATION FILED JAN. 7, 1914.
1,130,270.
Patented Mar. 2, 1915.
2 SHEETS—SHEET 2.
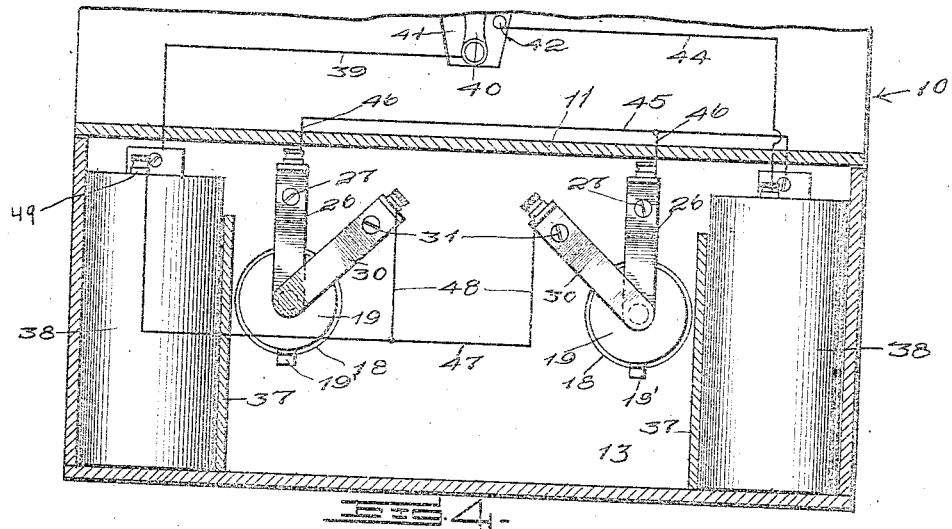
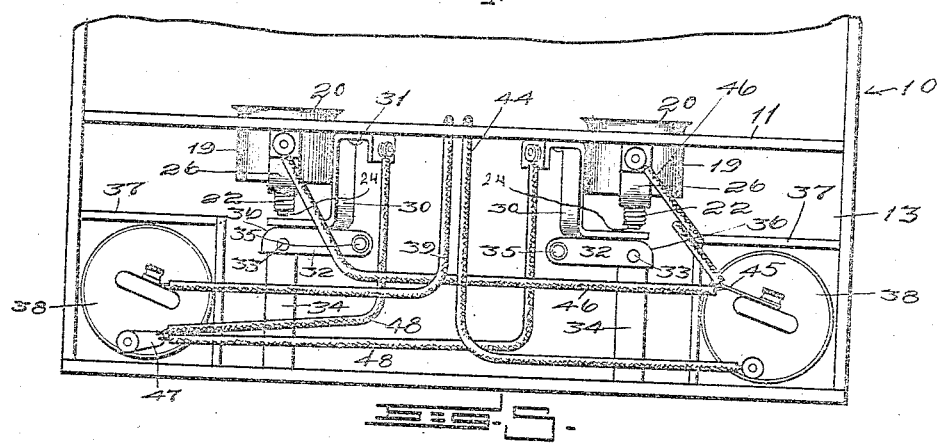
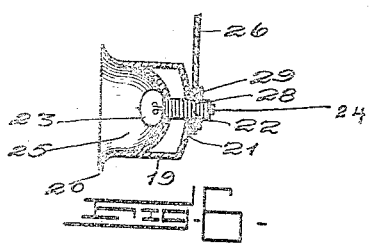
Witnesses
Inventor
J. M. Halley,
By C. L. Parker
Attorneys

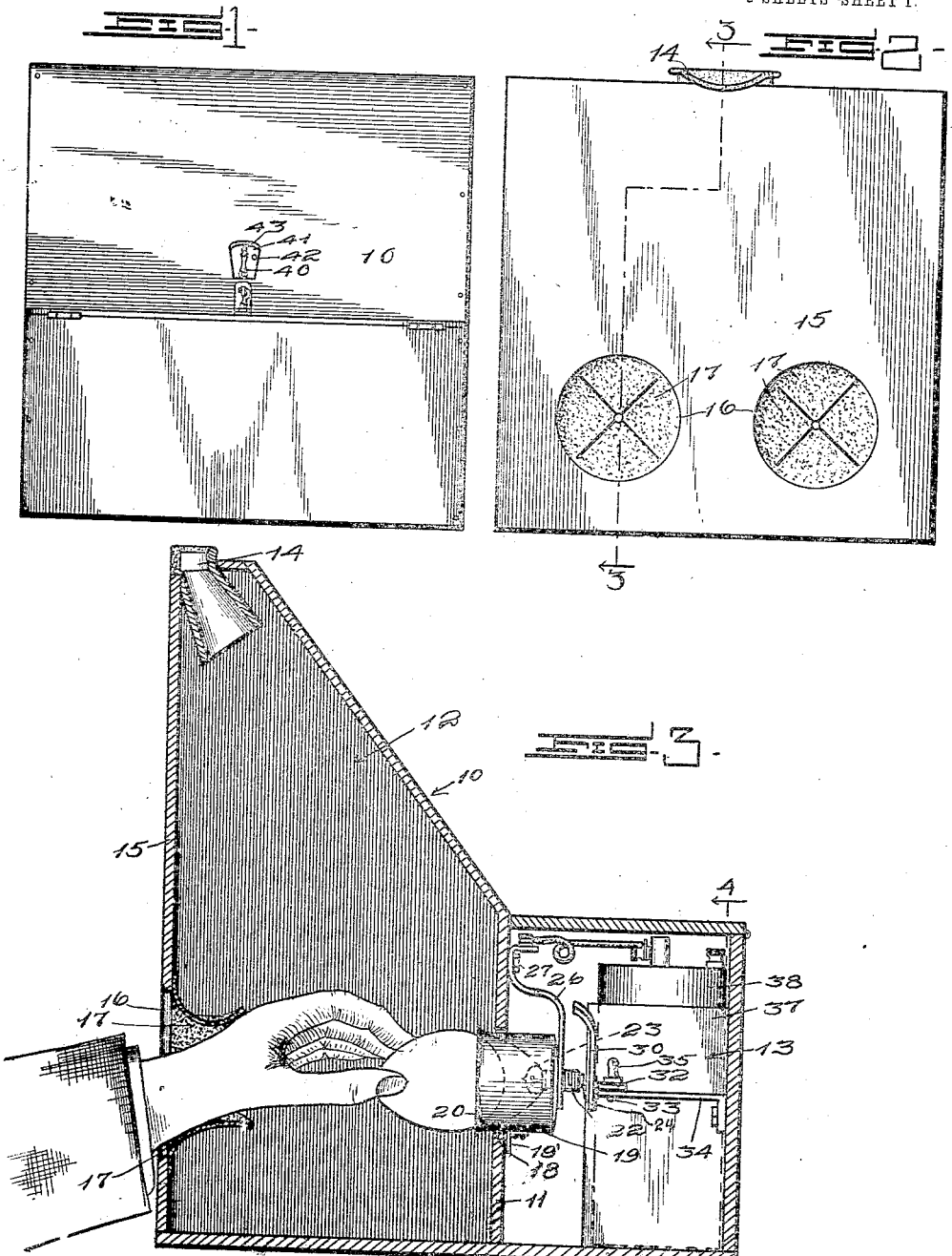

UNITED STATES PATENT OFFICE.

JAMES M. HALLEY, OF KEYTESVILLE, MISSOURI.

EGG-TESTER.

1,130,270.

Specification of Letters Patent. Patented Mar. 2, 1915.

Application filed January 7, 1914. Serial No. 810,810.

*To all whom it may concern:*

Be it known that I, JAMES M. HALLEY, a citizen of the United States, residing at Keytesville, in the county of Chariton and State of Missouri, have invented certain new and useful Improvements in Egg-Testers, of which the following is a specification.

My invention relates to improvements in egg testers and has particular reference to electrically operated means of this character.

An important object of this invention is to provide an egg tester of the above mentioned character, including a source of current, the entire apparatus being portable.

A further object of the invention is to provide novel and simple means for closing the circuit to cause an electric bulb to glow in suitable proximity to an egg, whereby the same may be tested.

A further object of the invention is to provide means whereby the electric bulb may be made to intermittently glow upon the movement of an egg into suitable proximity thereto, or made to permanently glow, at will.

A further object of the invention is to provide means of the above mentioned character, which are simple in construction, inexpensive to manufacture, convenient in use, and durable.

Other objects and advantages of this invention will be apparent during the course of the following description.

In the accompanying drawings forming a part of this specification and in which like numerals are employed to designate like parts throughout the same, Figure 1 is a front elevation of apparatus embodying my invention, Fig. 2 is a rear side elevation of the same, Fig. 3 is a transverse sectional view taken on line 3—3 of Fig. 2, Fig. 4 is a longitudinal sectional view taken on line 4—4 of Fig. 3, Fig. 5 is a plan view of the apparatus, parts being broken away, and parts removed, and Fig. 6 is a detail sectional view through one of the bulb holding casings.

In the drawings, wherein is illustrated a preferred embodiment of my invention, the numeral 10 designates an outer casing or shell as a whole, divided by a longitudinal partition 11, into a vertical testing casing or chamber 12 and a horizontal storage chamber 13. The testing chamber or casing 12 is provided at its upper end with a peep hole or opening 14, and upon its outer wall 15, and near the lower end thereof with a plurality of hand holes 16, which are covered by split sections of felt 17 or the like, serving to permit of the insertion of a hand through the opening 16, and adapted to fit closely about the same, to retain the test casing or chamber 12 as dark as may be practicable.

The main shell or casing 10 is preferably formed of wood and the partition 11 thereof is provided with suitably spaced openings 18, receiving bodily reciprocatory egg receiving cups or receptacles 19, the inner ends of which are closed and the outer ends of which are open and flared, as shown at 20. Each of these egg receiving cups or receptacles (see more particularly Fig. 6) has its closed end or bottom provided with a screw-threaded opening 21, for electrical engagement with the outer screw-threaded element 22 of the socket of an electric bulb 23 of any well known or preferred type. As is obvious, the filament of the bulb 23 has one end thereof electrically connected with the outer screw-threaded element 22 of the socket while the opposite end thereof is connected with an inner element 24, insulated from the outer screw-threaded element 22, as is the case with the ordinary incandescent lamp or bulb. The socket of the bulb 23 passes through a reflector 25, arranged within the cup or receptacle 19, rearwardly of the bulb 23, such reflector having its outer surface concave, as shown.

A circuit is closed to cause each bulb 23 to glow, upon the insertion of one end or portion of an egg within the flaring open end or the mouth of the cup or receptacle 19, and the inward bodily movement of the cup or receptacle 19 by the egg. To accomplish this I arrange within the storage casing or chamber 13, near each of the cups or receptacles 19, a spring 26, preferably formed of copper. This spring may be supported by any suitable means, and in the present instance is shown as connected or attached to the partition 11, which is formed of wood, by a screw 27. The free end of this electrical conducting spring is provided with a screw-threaded opening 28, more clearly shown in Fig. 6, for screw-threaded engagement with the outer screw-threaded element 22 of the socket of the bulb 23. I also preferably provide a clamping or lock nut 29, which is mounted upon the outer end of the screw-threaded outer element 22 of the electrical bulb socket.

The spring 26 serves two purposes, first as means for closing the circuit to cause the bulb 23 to glow, and second, as spring means to normally retain the cup or receptacle 19 in its outer position, whereby the circuit is broken. The outward bodily movement of the cup 19 and bulb 23 is positively limited by a lug 19', rigidly secured to the cup 19 and arranged to engage the partition 11, as shown. Arranged near and outwardly of the spring 26 is a contact element 30, which may be formed of a comparatively stiff copper spring, the same being attached or connected with the partition 11, by means of a screw 31 or the like. The free end of the contact 30 is arranged normally spaced from and in the path of travel of the outer end of the inner element 24 of the socket of the bulb or lamp 23, to engage therewith upon the bodily movement of the cup or receptacle 19 and bulb in the direction of the same. The numeral 32 designates a switch arm, arranged outwardly of and adjacent the free end of each of the contacts 30, such switch arm being pivoted at 33 with a relatively stationary support 34. The outer or free end of the switch arm 32 is provided with a crank or knob 35 by means of which the arm 32 may be conveniently swung outwardly whereby a cam face 36 formed upon the opposite end thereof will engage with the free end of the contact 30, forcing the same into electrical engagement with the outer end of the element 24 and permanently maintaining such electrical engagement until the switch arm is again moved in an opposite direction. The purpose of this switch arm is to provide means whereby the circuit causing the bulb 23 to glow, may be retained permanently closed for a desirable length of time.

The numeral 37 designates compartments formed within the storage casing or chamber 13, for receiving sources of current 38 preferably in the form of dry cells or batteries. These dry cells or batteries are connected in series while the bulbs or lamps 23 are connected in parallel with each other, as will be apparent. Connected with the positive pole of one of the batteries 38 is a wire 39, electrically connected with a pivoted element 40 included in a switch, preferably arranged upon the forward side of the testing casing or chamber 12, within a recess 41, as more clearly shown in Fig. 1. The pivoted switch element 40 may be readily moved into and out of engagement with a stationary contact 42 and for this purpose it is provided with an outwardly extending crank or handle 43. The contact 42 is connected with a wire 44, which is in turn connected with a negative pole of the other battery 38. Connected with the positive pole of the last named battery, is a common feed wire 45, having electrical connection by means of branch wires 46, with the springs 26, as more clearly illustrated in Fig. 4. A common return wire 47 is electrically connected with the contacts 30, by means of branch wires 48, such return wire 47 being connected with the negative pole of one battery 38, as shown at 49.

In the use of the apparatus, the switch element 40 is swung to the closed position for engagement with the contact 42. The operator may hold a suitable number of eggs in each hand, and pass his hands through the two openings 16. These eggs are then moved into the flaring openings or mouths 20, of the cups or receptacles 19, whereby these cups or receptacles may be moved outwardly, whereby inner elements 24 will electrically engage contacts 30. When this takes place circuits will be closed to cause the lamps or bulbs 23 to glow. In these closed circuits current flows from the positive pole of the battery 38 to the right, through wire 45, wires 46, springs 26, through the electric lamps or bulbs 23, contact 30, wires 48, wire 47, to the negative pole of the other battery 38, out through the positive pole of this battery, through wire 39, switch element 40, and through wire 44 back to the negative pole of the battery 38 to the right. When it is desired to retain either of the lamps or bulbs 23 permanently lighted for a prolonged period, the switch arm 32 is manipulated to move the free end of the contact 30 in engagement with the element 24, the outward movement of the cup or receptacle 19 being positively limited by the engagement of the lug 19' with the partition 11.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having described my invention, I claim:—

1. An egg tester of the character described, comprising a bodily movable egg receiving receptacle adapted to be moved to the active position by engagement with an egg, means to normally retain the receptacle in the inactive position and automatically return the same to such inactive position when moved therefrom and released, an electric bulb connected with the receptacle for movement therewith, and means to cause the electric bulb to glow upon the bodily movement of the receptacle to the active position.

2. An egg tester of the character described, comprising a reciprocatory egg receiving receptacle, an electric bulb connected with the receptacle for movement therewith and including a socket having inner and outer electrical conducting elements, an electrical conducting spring connected with the outer socket element and serving to move the reciprocatory receptacle in one direction, a contact disposed in the path of travel of the inner socket element, a source of current, and electrical connections between the electrical conducting spring and one pole of the source of current and between the contact and the opposite pole of the source of current.

3. An egg tester of the character described, comprising a reciprocatory egg receiving receptacle, an electric bulb connected with the receptacle for movement therewith and including a socket having inner and outer electrical conducting elements, an electrical conducting spring connected with the outer socket element and serving to move the reciprocatory receptacle in one direction, means to positively limit the movement of the receptacle in such direction, a contact disposed in the path of travel of the inner socket element, a source of current, and electrical connections between the electrical conducting spring and one pole of the source of current and between the contact and the opposite pole of the source of current.

4. An egg tester of the character described, comprising a reciprocatory egg receiving receptacle, an electric bulb connected with the receptacle for movement therewith and including a socket having inner and outer electrical conducting elements, an electrical conducting spring connected with the outer socket element and serving to move the reciprocatory receptacle in one direction, means to positively limit the movement of the receptacle in such direction, a contact disposed in the path of travel of the inner socket element, separate means to move the contact into engagement with the inner socket element when the latter is occupying its normal starting position, a source of current, and electrical connections between the electrical conducting spring and one pole of the source of current and between the contact and the opposite pole of the source of current.

5. An egg tester of the character described, comprising a testing shell having one wall thereof provided with an opening and its upper end portion provided with a peep hole, an egg receiving receptacle mounted to reciprocate within said opening, an electric bulb mounted within said receptacle, and means to cause the bulb to glow upon the movement of the receptacle in one direction.

6. An egg tester of the character described, comprising a casing including a transverse partition which divides the same into a forward testing chamber and a rear storage chamber, a movable egg receiving receptacle arranged within the rear portion of the testing chamber, a bulb mounted within the egg receiving receptacle, a source of current arranged within the storage chamber, and electrical connections between the bulb and source of current.

In testimony whereof I affix my signature in presence of two witnesses.

JAMES M. HALLEY.

Witnesses:
  WARREN ELLIOTT,
  GEO. N. ELLIOTT.